United States Patent
Ihlenburg et al.

(10) Patent No.: US 10,694,150 B2
(45) Date of Patent: Jun. 23, 2020

(54) MULTI-CAMERA VEHICLE VISION SYSTEM WITH DISTRIBUTED PROCESSING, DATA CONNECTION AND POWER SUPPLY

(71) Applicant: MAGNA ELECTRONICS INC., Auburn Hills, MI (US)

(72) Inventors: Joern Ihlenburg, Berlin (DE); Benjamin May, Lübs (DE); Boris Shulkin, West Bloomfield, MI (US)

(73) Assignee: MAGNA ELECTRONICS INC., Auburn Hills, ME (US)

( * ) Notice: Subject to any disclaimer, the term of this patent is extended or adjusted under 35 U.S.C. 154(b) by 477 days.

(21) Appl. No.: 15/484,292

(22) Filed: Apr. 11, 2017

(65) Prior Publication Data
US 2017/0295352 A1    Oct. 12, 2017

Related U.S. Application Data

(60) Provisional application No. 62/321,333, filed on Apr. 12, 2016.

(51) Int. Cl.
| | |
|---|---|
| H04N 7/18 | (2006.01) |
| H04N 13/243 | (2018.01) |
| H04N 13/128 | (2018.01) |
| H04N 13/239 | (2018.01) |
| H04N 13/00 | (2018.01) |

(52) U.S. Cl.
CPC .......... *H04N 7/181* (2013.01); *H04N 13/128* (2018.05); *H04N 13/239* (2018.05); *H04N 13/243* (2018.05); *H04N 2013/0081* (2013.01)

(58) Field of Classification Search
CPC .... H04N 7/181; H04N 13/128; H04N 13/239; H04N 13/243; H04N 2013/0081
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 8,179,236 B2 | 5/2012 | Weller et al. |
| 10,127,463 B2 | 11/2018 | Fursich |

(Continued)

*Primary Examiner* — Joseph W Becker
(74) *Attorney, Agent, or Firm* — Honigman LLP

(57) ABSTRACT

A vision system for a vehicle includes first and second camera modules disposed at the vehicle so as to have respective first and second fields of view exterior of the vehicle. The first camera module includes a first lens and a first imager, and is operable to capture image data. The second camera module includes a second lens and a second imager, and is operable to capture image data. The first camera module is powered by a first power supply line and the second camera module is powered by a second power supply line. The first camera module includes an image processor operable to process image data captured by the first camera module and the second camera module. The second camera module comprises a second image processor operable to process image data captured by the first camera module and the second camera module.

20 Claims, 6 Drawing Sheets

(56) References Cited

U.S. PATENT DOCUMENTS

| | | | |
|---|---|---|---|
| 2014/0085480 A1* | 3/2014 | Saptharishi | G06F 16/71 348/159 |
| 2014/0168415 A1 | 6/2014 | Ihlenburg et al. | |
| 2014/0218535 A1 | 8/2014 | Ihlenburg et al. | |
| 2014/0327774 A1* | 11/2014 | Lu | G06K 9/00791 348/148 |
| 2014/0362209 A1 | 12/2014 | Ziegenspeck et al. | |
| 2016/0191815 A1* | 6/2016 | Annau | H04N 5/247 348/38 |
| 2016/0209647 A1 | 7/2016 | Fursich | |
| 2017/0113613 A1 | 4/2017 | Van Dan Elzen et al. | |
| 2017/0174343 A1* | 6/2017 | Erickson | G16H 50/20 |
| 2017/0257546 A1 | 9/2017 | Shahid | |
| 2018/0191928 A1 | 7/2018 | Schaffner | |

\* cited by examiner

MULTI-CAMERA VEHICLE VISION SYSTEM WITH DISTRIBUTED PROCESSING, DATA CONNECTION AND POWER SUPPLY

CROSS REFERENCE TO RELATED APPLICATION

The present application claims the filing benefits of U.S. provisional application, Ser. No. 62/321,333, filed Apr. 12, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more stereo vision cameras to capture image data representative of images exterior of the vehicle. The present invention provides first and second cameras disposed at a vehicle so as to have respective fields of view exterior of the vehicle. Each of the cameras comprises a lens and an imager and is operable to capture image data. Each of the cameras is powered by a respective power supply line and may have a respective data communication line or link. One or both of the cameras includes an image processor operable to process image data captured by both of the cameras. The present invention thus provides a stereo camera with distributed redundant processing, redundant data lines or communication links and power supply lines.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
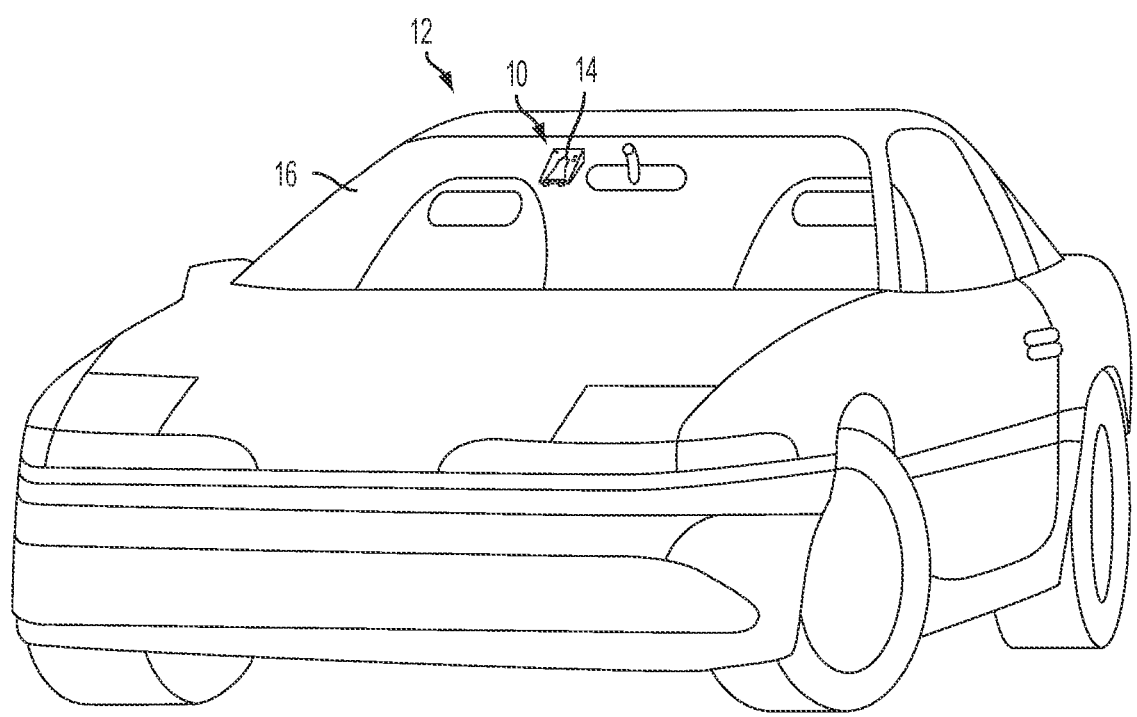
FIG. 1 is a plan view of a vehicle with a vision system that incorporates cameras in accordance with the present invention.

Referring now to the drawings and the illustrative embodiments depicted therein, a vehicle imaging or vision system 10 is disposed at a vehicle 12 and includes at least one exterior facing imaging sensor or camera, such as a forward facing imaging sensor or camera 14 disposed at and behind the windshield 16 of the vehicle so as to view through the windshield and forward of the vehicle (and the system may optionally include multiple exterior facing imaging sensors or cameras, such as a forward facing camera disposed at a front portion of the vehicle, a rearward facing camera at a rear portion of the vehicle, and sideward/rearward facing cameras at respective sides of the vehicle), which captures images exterior of the vehicle, with the camera having a lens for focusing images at or onto an imaging array or imaging plane or imager of the camera (FIG. 1). In the illustrated embodiment, the forward viewing camera 14 is disposed at the windshield of the vehicle and views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
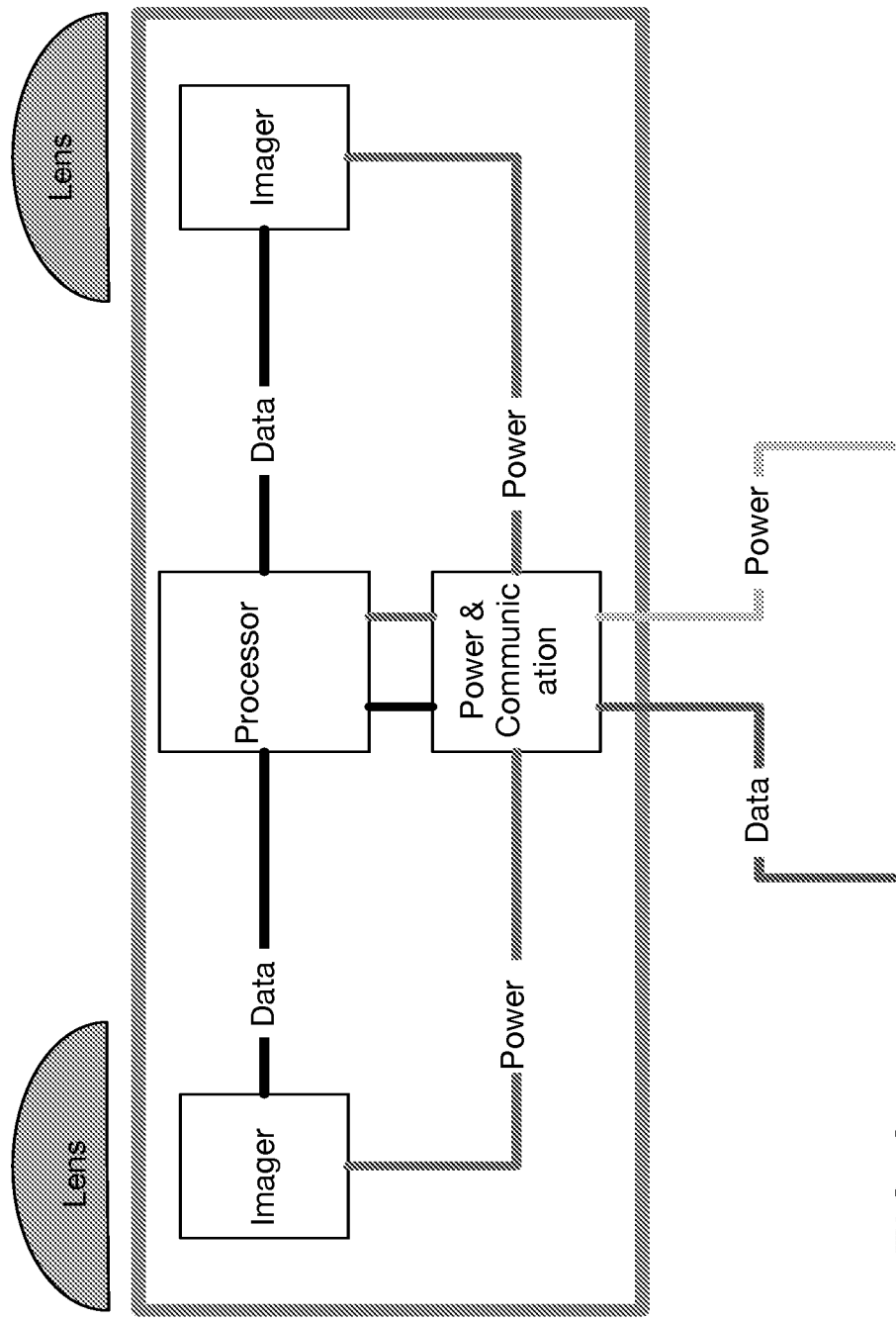
FIG. 2 is a schematic showing a prior art stereo imaging camera.

Front cameras for vehicle vision systems are either monocular or binocular (stereo). The stereo cameras comprise two imagers and two lenses, with the system having a single processing device that combines the image data captured by both imagers to compute depth information. Such stereo cameras are commonly disposed in one enclosure but versions exist with two separate cameras and a separate processing device. An exemplary stereo camera with unified processing is shown in FIG. 2, with the two imagers sharing a processor and power source. When using multiple cameras arranged in an array comprising a Stanford light field array (such as described in U.S. Publication No. US-2014-0168415, which is hereby incorporated herein by reference in its entirety), it is possible to capture and process light field data. Particular to light field data is that the viewpoint and focal point can be chosen independently in certain limits. From U.S. Publication No. US-2014-0168415, it is known to have all, bunches or groups of cameras [of a stereo or light field array camera system] sharing a common bus for communicating image data, [control] commands, initialization and position data (for the camera or cameras) to an image processing device.

The present invention provides two or more independent cameras that are connected in a stereo or light field configuration, where the processing device is part of either one of the cameras (case 1) or both of two cameras (case 2) or all of multiple cameras. As shown in FIGS. 3 and 4A-C, each camera 20 may include a respective imager 21 and processor 22, and may have its own power supply 23. The cameras are connected or linked or otherwise in communication with one another, and optionally in communication with a central controller 24 of the system, and are able to share image data captured by either or both cameras, as discussed below.

In the first case, where only one of the cameras has a processor or processing device, image data captured by the camera that does not have a processor is communicated to the camera containing the processor, where the computation of the depth information and other combined image processing takes place. An advantage of this configuration is ease of packaging because no unified enclosure is necessary (albeit such a unified enclosure is optional).

In the second case, where all cameras have their own processor, all cameras share their captured image data and since all cameras contain a processing device, the depth or light field information computation and other image processing tasks can be performed either simultaneously on some or all of the cameras (for redundancy) or in a distributed way (where some processing may be performed on camera 1, some on camera 2 and some processing may be performed on camera 'n' for performance and load balancing reasons). Of course, the system may mix or selectively combine the two modes in a selected or arbitrary fashion depending on the tasks to be performed.

To further enhance the functional safety aspect of the system, the cameras (for cases where both cameras have a processor or where only one of the two cameras has a processor) may include different lenses with different fields of view and may even have different imagers with different characteristics (such as different color filters and/or different sensitivities to certain wavelengths of light). For example, one camera may comprise a color camera (having a RGB color filter array or the like) and the other camera may comprise an IR camera (that is sensitive to the infrared or near infrared spectrum of light), such as by utilizing aspects of the systems described in U.S. Publication No. US-2016-0119527 and/or U.S. patent application Ser. No. 15/334,364, filed Oct. 26, 2016, which are hereby incorporated herein by reference in their entireties. Optionally, one or more cameras may comprise waver level cameras. Optionally, one or more cameras have lens arrays comprising a light field camera (in contrast to having an array of mono lens cameras comprising a Stanford Light Field). Optionally, the light field data pre-processing, such as the processing for a user selected view, may be done in a shared way by some or all cameras for limiting the amount of data that has to be transmitted to a vision processing device or display. Optionally, the fed display or displays may comprise stereoscopic or light field display or displays.

Figure 3:
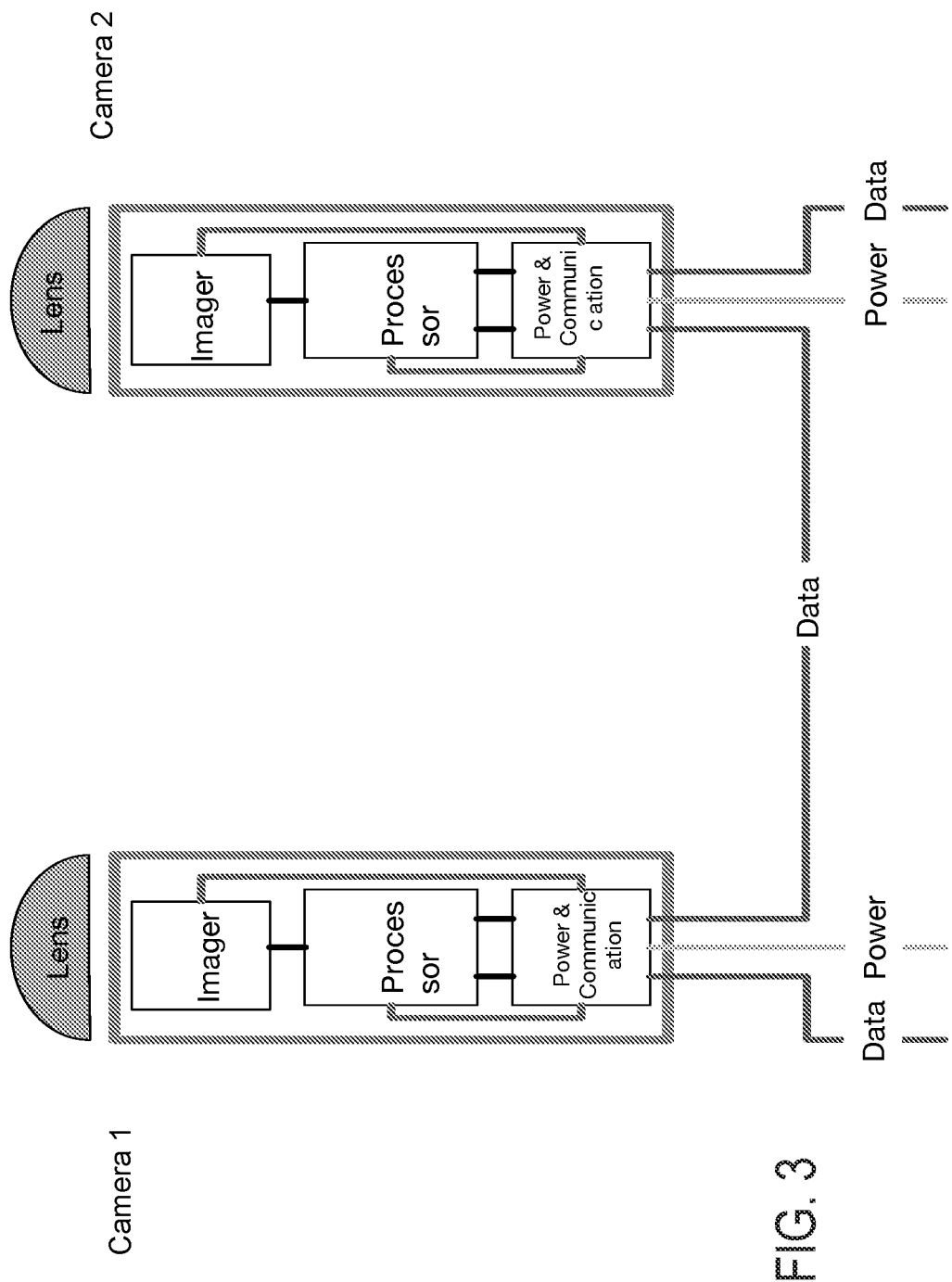
FIG. 3 is a schematic showing a stereo imaging camera in accordance with the present invention.

In applications where both cameras contain an image processor or processing device, the system can be further enhanced with at least two physically distinct communication channels per camera and a separate power connection for each camera (such as shown in FIG. 3). This enables double redundancy for high availability. Then, in case either one of the cameras fail or one of the communication channels fail or one of the power supply paths fail, the other camera can still perform the same tasks that a monocular camera can perform. Such redundancy is important for highly automated driving of a vehicle.

Optionally, the system may include two different sensing devices in a stereo configuration similar to the above cases. The system thus may have a combination of the two sensing devices (having different sensitivities or the like) so as to extend to applicable environmental conditions (such as, for example, to darker or brighter scenes or the like), while still having the necessary redundancy such that if one camera fails, the other may still provide the desired or necessary image processing and a safe state can still be reached. Such a configuration can be seen as an extension of the above cases while utilizing different sensors or cameras.

Figure 4A:
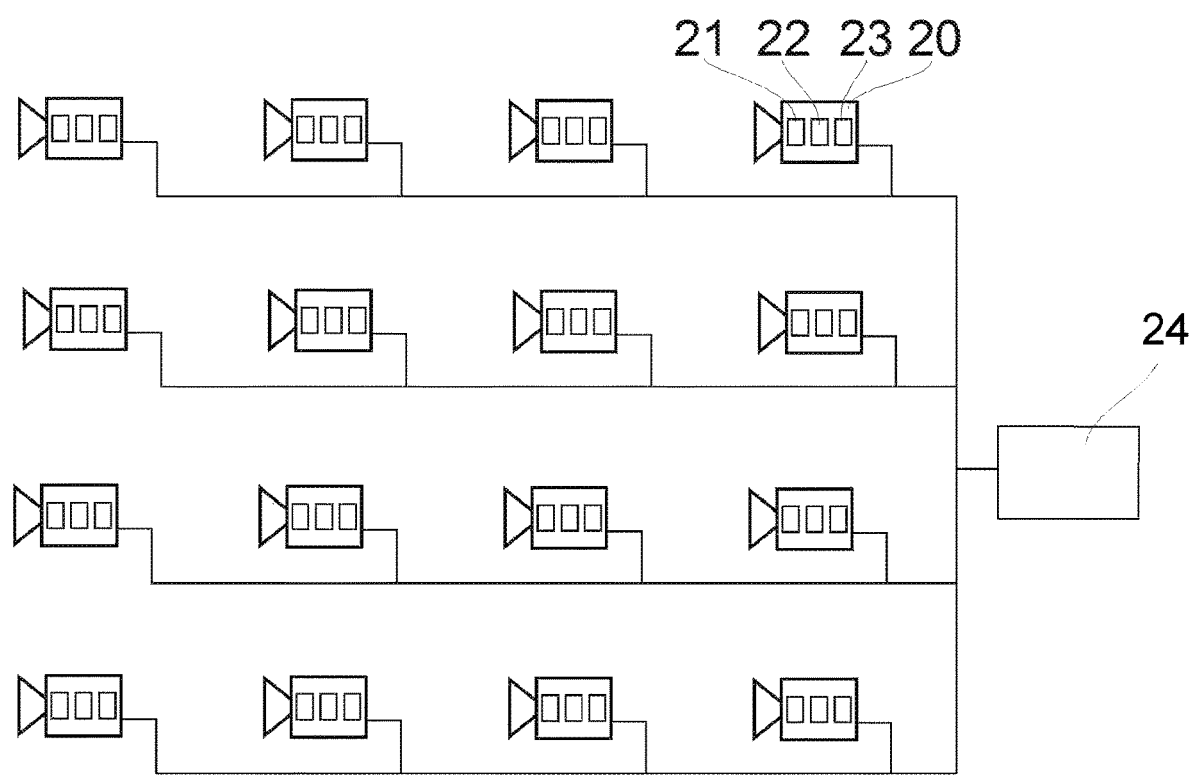
FIG. 4A is a schematic showing a camera array having combined power and data lines routed in a tree shape in accordance with the present invention.
Figure 4B:
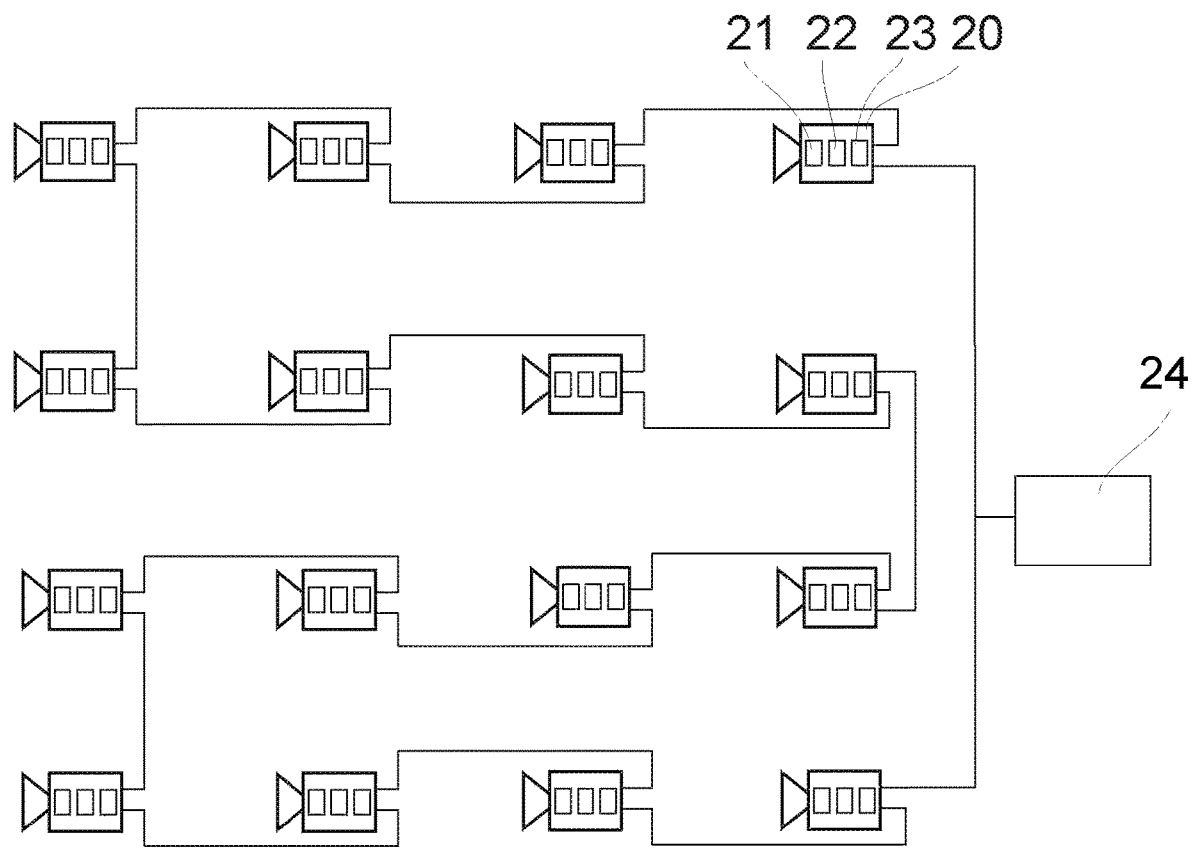
FIG. 4B is a schematic showing a camera array having combined power and data lines routed in a ring shape in accordance with the present invention.
Figure 4C:
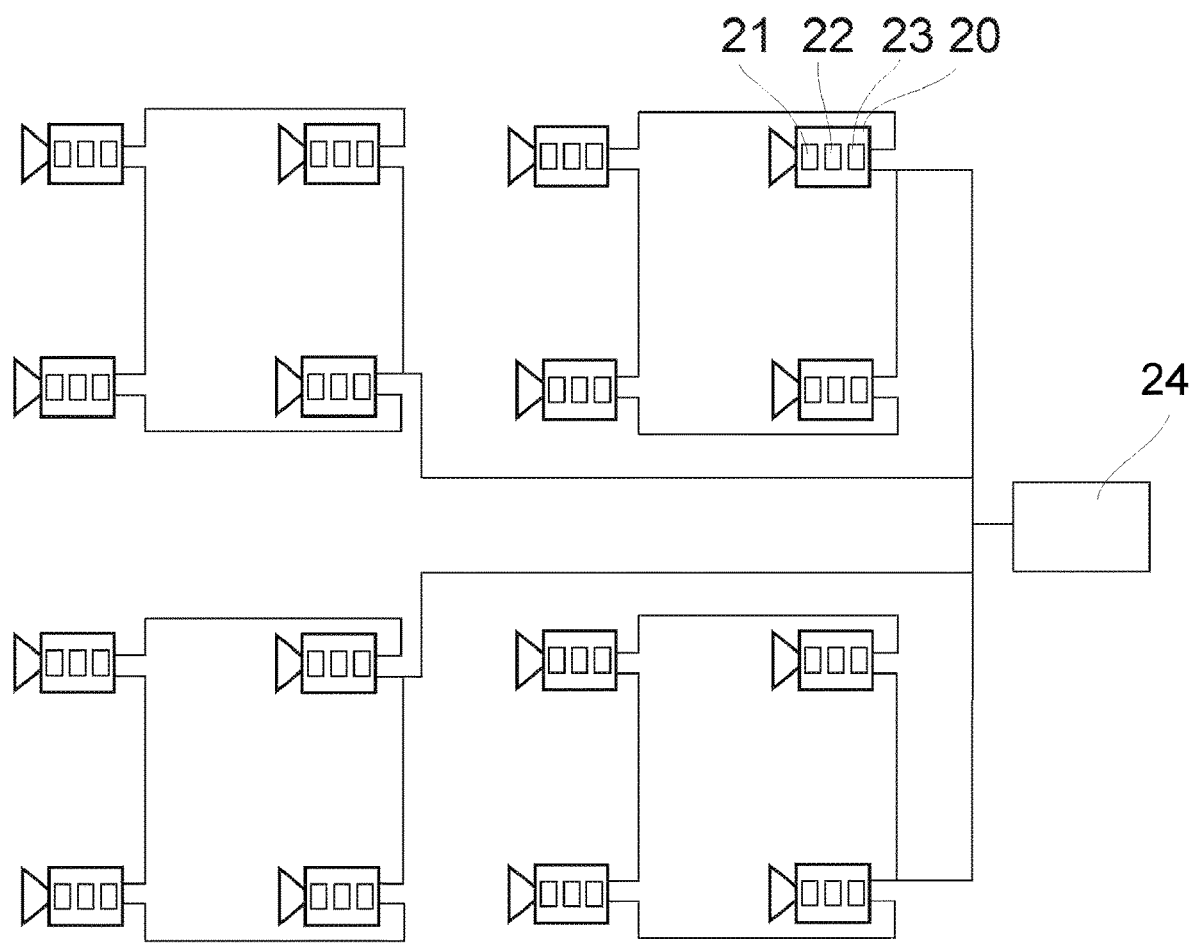
FIG. 4C is a schematic showing a camera array having combined power and data lines having a combination of ring and tree routings in accordance with the present invention.

Thus, the present invention provides a stereo or array camera with distributed redundant processing, redundant data lines or communication links and power supply lines. Optionally, the power line and data line or bus is a common line, such as having a coaxial line with AC or DC power voltage between a core and shield with data modulated (added) onto it, such as by utilizing aspects of the systems described in U.S. Publication Nos. US-2014-0218535 and US-2014-0362209, which are hereby incorporated herein by reference in their entireties. Optionally, the power and/or data line (or bus) and/or combined power and data line (or bus) is routed in a tree shape, such as shown in FIG. 4A (where there are multiple branches of cameras connected in series), or optionally routed in a ring shape, such as shown in FIG. 4B (where there are multiple cameras connected in a single series), or in combinations thereof, such as shown in FIG. 4C (where there are multiple rings or series connected to the system controller in parallel), when having multiple cameras or camera arrays. The system of the present invention thus provides image processing of image data captured by two imagers via an image processor of one or both cameras, thus providing redundant processing and depth determination capabilities for the vision system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 8,179,236; 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

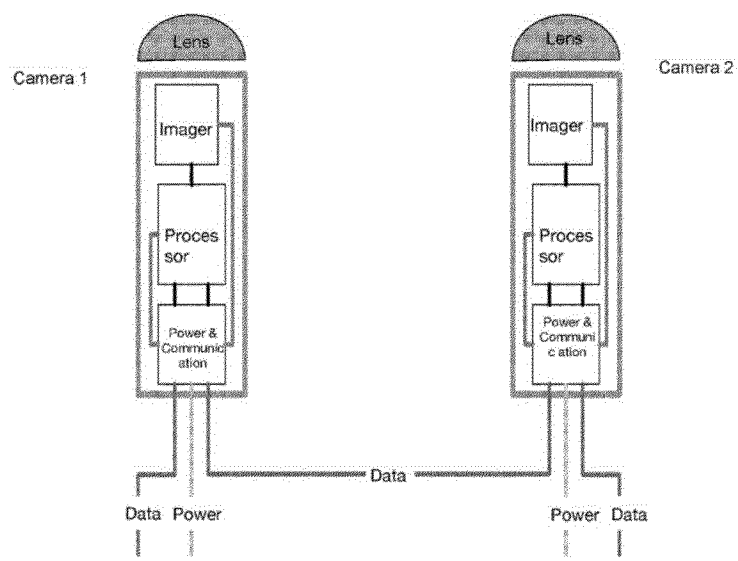

The invention claimed is:

1. A multi-camera vision system for a vehicle, said multi-camera vision system comprising:
    a first camera module disposed at a vehicle so as to have a first field of view exterior of the vehicle, wherein said first camera module comprises a first lens and a first imager, wherein said first camera module is operable to capture image data;
    a second camera module disposed at the vehicle so as to have a second field of view exterior of the vehicle, wherein said second camera module comprises a second lens and a second imager, wherein said second camera module is operable to capture image data;
    wherein said first camera module is powered by a first power supply line and wherein said second camera module is powered by a second power supply line;
    wherein image data captured by said first camera module is provided to said second camera module;
    wherein image data captured by said second camera module is provided to said first camera module;
    wherein said first camera module comprises a first image processor that (i) processes image data captured by said first camera module and (ii) processes image data captured by said second camera module that is provided to said first camera module; and wherein said second camera module comprises a second image processor that (i) processes image data captured by said second camera module and (ii) processes image data captured by said first camera module that is provided to said second camera module.

wherein depth information computations and other image processing tasks are performed simultaneously by said first and second image processors of said first and second camera modules;

wherein, for enhancement of system performance and enhanced balancing of image processing loads, some of the depth information computations and other image processing tasks are performed at said first camera module by (i) processing image data captured by said first camera module and (ii) processing image data captured by said second camera module that is provided to said first camera module, and others of the depth information computations and other image processing tasks are performed at said second camera module by (i) processing image data captured by said second camera module and (ii) processing image data captured by said first camera module that is provided to said second camera module; and wherein said vision system selectively combines processing by said first and second image processors depending on tasks to be performed by said multi-camera vision system.

2. The multi-camera vision system of claim 1, wherein said first and second camera modules share image data captured by said first and second camera modules.

3. The multi-camera vision system of claim 2, wherein depth information computations and other image processing tasks are performed simultaneously by said first and second image processors of said first and second camera modules.

4. The multi-camera vision system of claim 3, wherein, for enhancement of system performance and enhanced balancing of image processing loads, some of the depth information computations and other image processing tasks are performed at said first camera module by (i) processing image data captured by said first camera module and (ii) processing image data captured by said second camera module that is provided to said first camera module, and others of the depth information computations and other image processing tasks are performed at said second camera module by (i) processing image data captured by said second camera module and (ii) processing image data captured by said first camera module that is provided to said second camera module.

5. The multi-camera vision system of claim 4, wherein said vision system selectively combines processing by said first and second image processors depending on tasks to be performed by said multi-camera vision system.

6. The multi-camera vision system of claim 1, wherein processing of captured image data by said first image processor determines depth information.

7. The multi-camera vision system of claim 1, wherein said first and second camera modules are disposed in a common housing.

8. The multi-camera vision system of claim 1, wherein said first lens is different from said second lens.

9. The multi-camera vision system of claim 1, wherein said first camera module comprises spectral filtering that is different from spectral filtering of said second camera module.

10. The multi-camera vision system of claim 1, comprising at least six camera modules each comprising a respective lens, imager and image processor, and wherein said at least six camera modules are electrically connected together and to a central controller via a connection network.

11. The multi-camera vision system of claim 10, wherein said connection network comprises a series connection of said at least six camera modules.

12. The multi-camera vision system of claim 10, wherein said connection network comprises two branches of serially connected camera modules connected to said central controller.

13. A multi-camera vision system for a vehicle, said multi-camera vision system comprising:

a first camera module disposed at a vehicle so as to have a first field of view exterior of the vehicle, wherein said first camera module comprises a first lens and a first imager, wherein said first camera module is operable to capture image data;

a second camera module disposed at the vehicle so as to have a second field of view exterior of the vehicle, wherein said second camera module comprises a second lens and a second imager, wherein said second camera module is operable to capture image data;

wherein said first camera module is powered by a first power supply line and wherein said second camera module is powered by a second power supply line;

wherein said first camera module communicates image data captured by said first camera module to said second camera module, and wherein said second camera module communicates image data captured by said second camera module to said first camera module;

wherein said first camera module comprises a first image processor that (i) processes image data captured by said first camera module and (ii) processes image data captured by said second camera module that is communicated to said first camera module;

wherein said second camera module comprises a second image processor that (i) processes image data captured by said second camera module and (ii) processes image data captured by said first camera module that is communicated to said second camera module;

wherein depth information computations and other image processing tasks are performed simulataneously by said first and second image processors of said forst and second camera modules; and wherein, for enhancement of system performance and enhanced balancing of image processing loads, some image processing tasks are performed at said first camera module by (i) processing image data captured by said first camera module and (ii) processing image data captured by said second camera module that is communicated to said first camera module, and other image processing tasks are performed at said second camera module by (i) processing image data captured by said second camera module and (ii) processing image data captured by said first camera module that is communicated to said second camera module.

14. The multi-camera vision system of claim 13, wherein said vision system selectively combines processing by said first and second image processors depending on tasks to be performed by said multi-camera vision system.

15. The multi-camera vision system of claim 13, wherein said first and second camera modules are disposed in a common housing, and wherein at least one of (i) said first lens is different from said second lens, and (ii) said first camera module comprises spectral filtering that is different from spectral filtering of said second camera module.

16. The multi-camera vision system of claim 15, wherein processing by said first image processor of image data captured by said first camera module and of image data captured by said second camera module that is communicated to said first camera module determines depth information.

17. A multi-camera vision system for a vehicle, said multi-camera vision system comprising:

a first camera module disposed at a vehicle so as to have a first field of view exterior of the vehicle, wherein said first camera module comprises a first lens and a first imager, wherein said first camera module is operable to capture image data;

a second camera module disposed at the vehicle so as to have a second field of view exterior of the vehicle, wherein said second camera module comprises a second lens and a second imager, wherein said second camera module is operable to capture image data;

wherein said first camera module is powered by a first power supply line and wherein said second camera module is powered by a second power supply line;

wherein image data captured by said first camera module is provided to said second camera module;

wherein image data captured by said second camera module is provided to said first camera module;

wherein said first camera module comprises a first image processor that (i) processes image data captured by said first camera module and (ii) processes image data captured by said second camera module that is provided to said first camera module;

wherein said second camera module comprises a second image processor that (i) processes image data captured by said second camera module and (ii) processes image data captured by said first camera module that is provided to said second camera module;

wherein said first and second camera modules share image data captured by said first and second camera modules;

wherein depth information computations and other image processing tasks are performed simultaneously by said first and second image processors of said first and second camera modules; and wherein, for enhancement of system performance and enhanced balancing of image processing loads, some of the depth information computations and image processing tasks are performed at said first camera module by (i) processing image data captured by said first camera module and (ii) processing image data captured by said second camera module that is provided to said first camera module, and others of the depth information computations and image processing tasks are performed at said second camera module by (i) processing image data captured by said second camera module and (ii) processing image data captured by said first camera module that is provided to said second camera module.

18. The multi-camera vision system of claim 17, wherein said vision system selectively combines processing by said first and second image processors depending on tasks to be performed by said multi-camera vision system.

19. The multi-camera vision system of claim 17, wherein said first and second camera modules are disposed in a common housing, and wherein at least one of (i) said first lens is different from said second lens, and (ii) said first camera module comprises spectral filtering that is different from spectral filtering of said second camera module.

20. The multi-camera vision system of claim 17, comprising at least six camera modules each comprising a respective lens, imager and image processor, and wherein said at least six camera modules are electrically connected together and to a central controller via a connection network.

* * * * *

UNITED STATES PATENT AND TRADEMARK OFFICE
CERTIFICATE OF CORRECTION

Page 1 of 5

PATENT NO. : 10,694,150 B2
APPLICATION NO. : 15/484292
DATED : June 23, 2020
INVENTOR(S) : Joern Ihlenburg et al.

It is certified that error appears in the above-identified patent and that said Letters Patent is hereby corrected as shown below:

On the Title Page

Remove Title Page and Replace with attached Title Page

In the Specification

Column 7
Line 2, "module; and" should be --module;--
Line 7, "module." should be --module;--

In the Claims

Column 7
Lines 31-55, Claims 2-5 should be removed

Claims 6-9, shown at Lines 56-67 should be renumbered as follows:
2. The multi-camera vision system of claim 1, wherein processing of captured image data by said first image processor determines depth information.

3. The multi-camera vision system of claim 1, wherein said first and second camera modules are disposed in a common housing.

4. The multi-camera vision system of claim 1, wherein said first lens is different from said second lens.

5. The multi-camera vision system of claim 1, wherein said first camera module comprises spectral filtering that is different from spectral filtering of said second camera module.

Column 8
Lines 1-12, Claims 10-12 should be renumbered as follows:

Signed and Sealed this
Sixth Day of October, 2020

Andrei Iancu
*Director of the United States Patent and Trademark Office*

CERTIFICATE OF CORRECTION (continued)
U.S. Pat. No. 10,694,150 B2

6. The multi-camera vision system of claim 1, comprising at least six camera modules each comprising a respective lens, imager and image processor, and wherein said at least six camera modules are electrically connected together and to a central controller via a connection network.

7. The multi-camera vision system of claim 6, wherein said connection network comprises a series connection of said at least six camera modules.

8. The multi-camera vision system of claim 6, wherein said connection network comprises two branches of serially connected camera modules connected to said central controller.

Claim 13 needs to be renumbered and corrected on Lines 14-59 as follows:
9. A multi-camera vision system for a vehicle, said multi-camera vision system comprising:
   a first camera module disposed at a vehicle so as to have a first field of view exterior of the vehicle, wherein said first camera module comprises a first lens and a first imager, wherein said first camera module is operable to capture image data;
   a second camera module disposed at the vehicle so as to have a second field of view exterior of the vehicle, wherein said second camera module comprises a second lens and a second imager, wherein said second camera module is operable to capture image data;
   wherein said first camera module is powered by a first power supply line and wherein said second camera module is powered by a second power supply line;
   wherein said first camera module communicates image data captured by said first camera module to said second camera module, and wherein said second camera module communicates image data captured by said second camera module to said first camera module;
   wherein said first camera module comprises a first image processor that (i) processes image data captured by said first camera module and (ii) processes image data captured by said second camera module that is communicated to said first camera module; wherein said second camera module comprises a second image processor that (i) processes image data captured by said second camera module and (ii) processes image data captured by said first camera module that is communicated to said second camera module;
   wherein said first and second camera modules share image data captured by said first and second camera modules;
   wherein depth information computations and other image processing tasks are performed simultaneously by said first and second image processors of said first and second camera modules; and
   wherein, for enhancement of system performance and enhanced balancing of image processing loads, some of the depth information computations and other image processing tasks are performed at said first camera module by (i) processing image data captured by said first camera module and (ii) processing image data captured by said second camera module that is communicated to said first camera module, and others of the depth information computations and other image processing tasks are performed at said second camera module by (i) processing image data captured by said second camera module and (ii) processing image data captured by said first camera module that is communicated to said second camera module.

Lines 60-66, Claims 14 and 15 should be renumbered as follows:

CERTIFICATE OF CORRECTION (continued)

U.S. Pat. No. 10,694,150 B2

10. The multi-camera vision system of claim 9, wherein said vision system selectively combines processing by said first and second image processors depending on tasks to be performed by said multi-camera vision system.

11. The multi-camera vision system of claim 9, wherein said first and second camera modules are disposed in a common housing, and wherein at least one of (i) said first lens is different from said second lens, and (ii) said first camera module comprises spectral filtering that is different from spectral filtering of said second camera module.

<u>Column 9</u>
Lines 3-37, Claims 16 and 17 should be renumbered as follows:
12. The multi-camera vision system of claim 11, wherein processing by said first image processor of image data captured by said first camera module and of image data captured by said second camera module that is communicated to said first camera module determines depth information.

13. A multi-camera vision system for a vehicle, said multi-camera vision system comprising:
 a first camera module disposed at a vehicle so as to have a first field of view exterior of the vehicle, wherein said first camera module comprises a first lens and a first imager, wherein said first camera module is operable to capture image data;
 a second camera module disposed at the vehicle so as to have a second field of view exterior of the vehicle, wherein said second camera module comprises a second lens and a second imager, wherein said second camera module is operable to capture image data;
 wherein said first camera module is powered by a first power supply line and wherein said second camera module is powered by a second power supply line;
 wherein image data captured by said first camera module is provided to said second camera module;
 wherein image data captured by said second camera module is provided to said first camera module;
 wherein said first camera module comprises a first image processor that (i) processes image data captured by said first camera module and (ii) processes image data captured by said second camera module that is provided to said first camera module;
 wherein said second camera module comprises a second image processor that (i) processes image data captured by said second camera module and (ii) processes image data captured by said first camera module that is provided to said second camera module;
 wherein said first and second camera modules share image data captured by said first and second camera modules;
 wherein depth information computations and other image processing tasks are performed simultaneously by said first and second image processors of said first and second camera modules; and
 wherein, for enhancement of system performance and enhanced balancing of image processing loads, some of the depth information computations and image processing tasks are performed at said first camera module by (i) processing image data captured by said first camera module and (ii) processing image data captured by said second camera module that is provided to said first camera module, and others of the depth information computations and image processing tasks are performed at said second camera module by (i) processing image data captured by said second camera module and (ii) processing image data captured by said first camera module that is provided to said second camera module.

Lines 22-36, Claims 18-20 should be renumbered as follows:

14. The multi-camera vision system of claim 13, wherein said vision system selectively combines processing by said first and second image processors depending on tasks to be performed by said multi-camera vision system.

15. The multi-camera vision system of claim 13, wherein said first and second camera modules are disposed in a common housing, and wherein at least one of (i) said first lens is different from said second lens, and (ii) said first camera module comprises spectral filtering that is different from spectral filtering of said second camera module.

16. The multi-camera vision system of claim 13, comprising at least six camera modules each comprising a respective lens, imager and image processor, and wherein said at least six camera modules are electrically connected together and to a central controller via a connection network.

(12) United States Patent
Ihlenburg et al.

(10) Patent No.: US 10,694,150 B2
(45) Date of Patent: Jun. 23, 2020

(54) MULTI-CAMERA VEHICLE VISION SYSTEM WITH DISTRIBUTED PROCESSING, DATA CONNECTION AND POWER SUPPLY

(71) Applicant: MAGNA ELECTRONICS INC., Auburn Hills, MI (US)

(72) Inventors: Joern Ihlenburg, Berlin (DE); Benjamin May, Lübs (DE); Boris Shulkin, West Bloomfield, MI (US)

(73) Assignee: MAGNA ELECTRONICS INC., Auburn Hills, ME (US)

( * ) Notice: Subject to any disclaimer, the term of this patent is extended or adjusted under 35 U.S.C. 154(b) by 477 days.

(21) Appl. No.: 15/484,292

(22) Filed: Apr. 11, 2017

(65) Prior Publication Data
US 2017/0295352 A1 Oct. 12, 2017

Related U.S. Application Data

(60) Provisional application No. 62/321,333, filed on Apr. 12, 2016.

(51) Int. Cl.
*H04N 7/18* (2006.01)
*H04N 13/243* (2018.01)
*H04N 13/128* (2018.01)
*H04N 13/239* (2018.01)
*H04N 13/00* (2018.01)

(52) U.S. Cl.
CPC ........... *H04N 7/181* (2013.01); *H04N 13/128* (2018.05); *H04N 13/239* (2018.05); *H04N 13/243* (2018.05); *H04N 2013/0081* (2013.01)

(58) Field of Classification Search
CPC .... H04N 7/181; H04N 13/128; H04N 13/239; H04N 13/243; H04N 2013/0081
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,179,236 | B2 | 5/2012 | Weller et al. |
| 10,127,463 | B2 | 11/2018 | Fursich |

(Continued)

*Primary Examiner* — Joseph W Becker
(74) *Attorney, Agent, or Firm* — Honigman LLP

(57) ABSTRACT

A vision system for a vehicle includes first and second camera modules disposed at the vehicle so as to have respective first and second fields of view exterior of the vehicle. The first camera module includes a first lens and a first imager, and is operable to capture image data. The second camera module includes a second lens and a second imager, and is operable to capture image data. The first camera module is powered by a first power supply line and the second camera module is powered by a second power supply line. The first camera module includes an image processor operable to process image data captured by the first camera module and the second camera module. The second camera module comprises a second image processor operable to process image data captured by the first camera module and the second camera module.

16 Claims, 6 Drawing Sheets